US010055309B1

(12) United States Patent
Samad et al.

(10) Patent No.: US 10,055,309 B1
(45) Date of Patent: Aug. 21, 2018

(54) PARALLEL RESTORATION OF A VIRTUAL MACHINE'S VIRTUAL MACHINE DISKS

(71) Applicant: EMC Corporation, Hopkinton, MA (US)

(72) Inventors: Mohammed Abdul Samad, Bangalore (IN); Jafarullah Noordeen, Bangalore (IN); Rajiv Aradhyula, Bangalore (IN); Mahesh Rao, Bangalore (IN); Chandrakantha Nagaraja, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/869,195

(22) Filed: Sep. 29, 2015

(51) Int. Cl.
  *G06F 9/455*  (2018.01)
  *G06F 11/14*  (2006.01)

(52) U.S. Cl.
  CPC ...... *G06F 11/1464* (2013.01); *G06F 9/45558* (2013.01); *G06F 11/1469* (2013.01); *G06F 2009/45583* (2013.01); *G06F 2201/815* (2013.01)

(58) Field of Classification Search
  CPC .................................................. G06F 11/1464
  See application file for complete search history.

(56) References Cited

U.S. PATENT DOCUMENTS

| | | | | |
|---|---|---|---|---|
| 2006/0225065 | A1* | 10/2006 | Chandhok | ........... G06F 11/1458 717/168 |
| 2012/0072685 | A1* | 3/2012 | Otani | .................. G06F 11/1451 711/162 |
| 2015/0220397 | A1* | 8/2015 | Uchiyama | ........... G06F 11/1096 714/6.24 |
| 2015/0237132 | A1* | 8/2015 | Antony | ............... H04L 67/1095 709/224 |

* cited by examiner

*Primary Examiner* — Charlie Sun
(74) *Attorney, Agent, or Firm* — Dergosits & Noah LLP; Todd A. Noah

(57) ABSTRACT

Parallel restoration of a virtual machine's virtual machine disks is described. A system identifies restoration parameters for restoring multiple virtual machine disks associated with a virtual machine. The system identifies multiple available threads in an image proxy appliance that are sufficient for parallel restoration of each of the multiple virtual machine disks. Each of the multiple available threads restores a corresponding virtual machine disk as a corresponding dummy virtual machine, based on the restoration parameters. The system attaches the multiple dummy virtual machines to the virtual machine as the multiple virtual machine disks.

20 Claims, 3 Drawing Sheets

PARALLEL RESTORATION OF A VIRTUAL MACHINE'S VIRTUAL MACHINE DISKS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A virtual machine is a software implementation of a computer that executes programs like a physical machine. A system virtual machine provides a complete system platform which supports the execution of a complete operating system, and usually emulates an existing architecture, including disks. Multiple instances of virtual machines lead to more efficient use of computing resources, both in terms of energy consumption and cost effectiveness, known as hardware virtualization, the key to a cloud computing environment. Similar to other data objects, backup copies may be made of virtual machine data objects to enable a restoration of the virtual machine data objects in the event of corruption or an erroneous update to the virtual machine data objects.

An image is a capture of a state of a data object, such as a file system, a virtual machine, or an application, at a specific moment in time. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create images of data objects and store the images of data objects on multiple storage arrays.

DETAILED DESCRIPTION

Figure 1:
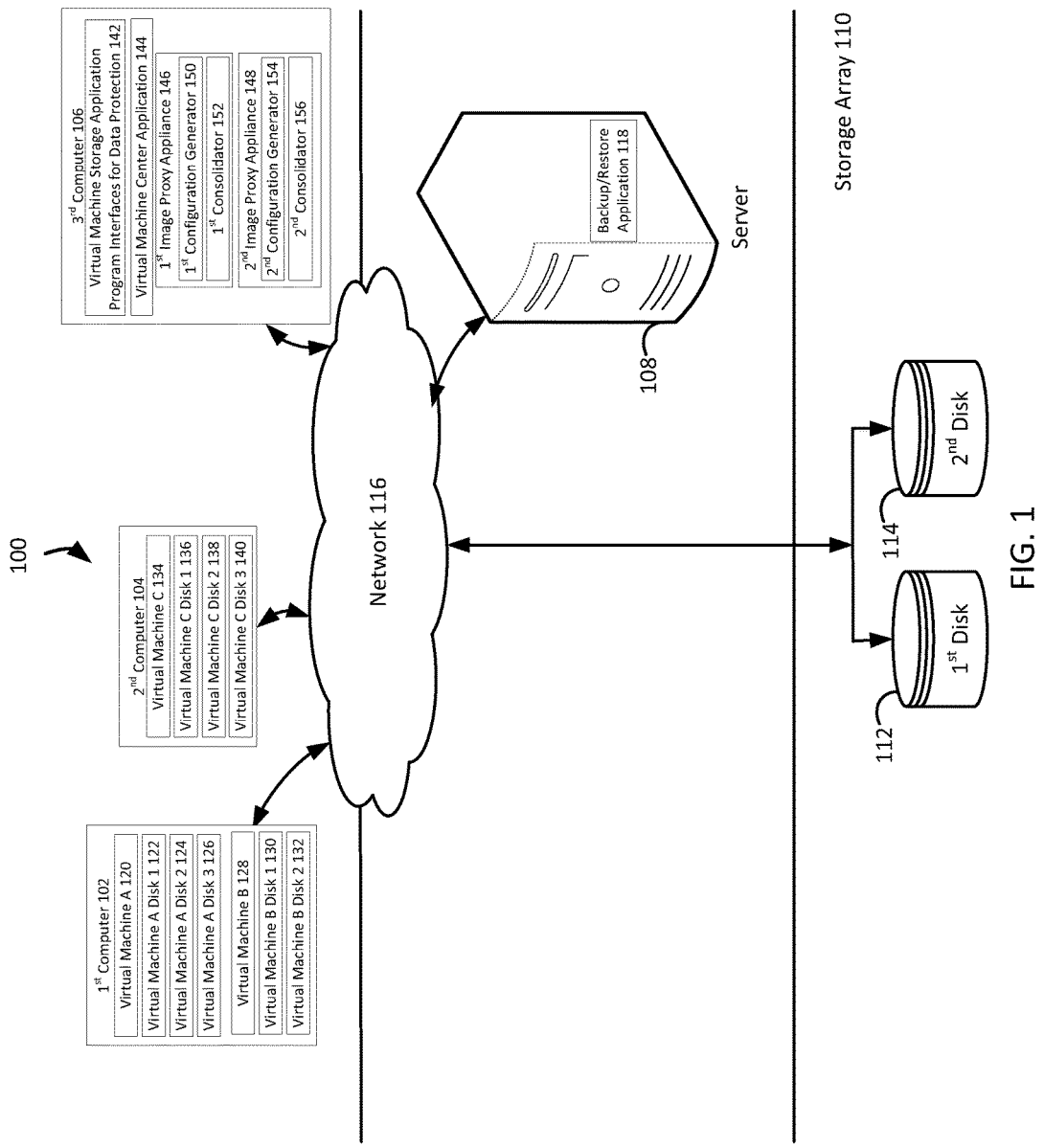
FIG. 1 illustrates a block diagram of an example system for parallel restoration of a virtual machine's virtual machine disks, under an embodiment.

A backup and restore application may be supported by virtual machine storage application program interfaces for data protection. During disaster recovery, such a backup and restore application, and some other backup and restore applications, may use a single image proxy appliance to restore a backup copy of a virtual machine that failed as an altogether new virtual machine. A virtual machine may use multiple virtual machine disks, such as when a datacenter virtual machine uses one virtual machine disk for the datacenter's operating system and other virtual machine disks for the datacenter's other data. During disaster recovery of a virtual machine with multiple attached virtual machine disks, such a backup and restore application, and some other backup and restore applications, provides the required virtual machine restoration parameters to an image proxy appliance, which iterates through a list of the virtual machine disks to sequentially restore only one virtual machine disk per virtual machine at a time. The restoration duration can be relatively long because the image proxy appliance restores an entire virtual machine image which includes multiple virtual machine disks via a single image proxy agent, iterating through all of the virtual machine's virtual machine disks in a sequential manner, thereby becoming a bottleneck that impacts the overall recovery time objectives.

Embodiments herein enable parallel restoration of a virtual machine's virtual machine disks. Restoration parameters are identified for restoring multiple virtual machine disks associated with a virtual machine. Multiple available threads are identified in an image proxy appliance that are sufficient for parallel restoration of each of the multiple virtual machine disks. Each of the multiple available threads restores a corresponding virtual machine disk as a corresponding dummy virtual machine, based on the restoration parameters. The multiple dummy virtual machines are attached to the virtual machine as the multiple virtual machine disks.

For example, a backup application identifies restoration parameters stored in backup storage for a failed virtual machine and the failed virtual machine's three virtual machine disks, and sends the restoration parameters to an image proxy appliance. The image proxy appliance identifies two of its available threads that are sufficient for parallel restoration of the second and the third virtual machine disks while the first virtual machine disk is being restored. Each of the two available threads restores a corresponding virtual machine disk as a corresponding dummy virtual machine while the first virtual machine disk is being restored, based on the restoration parameters. The image proxy appliance attaches the two dummy virtual machines with the restored first virtual machine disk to the virtual machine which has been restored, as the virtual machine's three virtual machine disks. The parallel restoration of multiple virtual machine disks improves on meeting recovery time objectives, enhances the total customer experience, and may be particularly beneficial for virtual machines that have dynamic virtual machine disks and for logical volume managers for which virtual machine disks have data striped or mirrored across.

FIG. 1 illustrates a diagram of a system that enables parallel restoration of a virtual machine's virtual machine disks, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first computer 102, a second computer 104, and a third computer 106; and a first server 108, and a storage array 110 that may be provided by a hosting company. The storage array 110 includes a first disk 112 and a second disk 114. The computers 102-106, the server 108, and the storage array 110 communicate via a network 116. Although FIG. 1 depicts the system 100 with three computers 102-106, one server 108, one storage array 110, two disks 112-114, and one network 116, the system 100 may include any number of computers 102-106, any number of servers 108, any number of storage arrays 110, any number of disks 112-114, and any number of networks 116. The computers 102-106 and the server 108 may each be substantially similar to the system 300 depicted in FIG. 3 and described below.

The server 108, which may be referred to as a backup server 108, includes a backup/restore application 118 that can create backup files of data objects for the computers 102-104, and execute a rollback based on the backup files. The backup/restore application 118 may provide centralized administration, such as scheduling, monitoring, and managing backup operations and backup files. The backup/restore application 118 can enable the storing of backup operation schedules, client policies, and client configurations. The backup/restore application 118 may provide a unique interface to the computers 102-104 during login, and assist the backup server 108 in authenticating and registering the computers 102-104. The backup/restore application 118 can send backup/restore work orders for the computers 102-104, which may indirectly receive and process the work orders to start a backup or restore operation. The backup/restore application 118 executes server-side processes for a system administrator's graphical management console, which may enable the system administrator to use command line interface tools for queries. For example, a system administrator identifies the computers 102-104 registered with the backup server 108.

Although FIG. 1 depicts the backup/restore application 118 residing completely on the backup server 108, the backup/restore application 118 may reside in any combination of partially on the backup server 108 and partially on the computers 102-104. Even though the following paragraphs describe EMC Corporation's Avamar® backup/restore application and EMC Corporation's NetWorker® backup/restore application as examples of the backup/restore application 118, the backup/restore application 118 may be any other backup/restore application which provides the backup/restore functionalities described in the Background section.

The backup/restore application 118 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 118 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The first computer 102 includes a virtual machine A 120, to which are attached a virtual machine A disk 1 122, a virtual machine A disk 2 124, and a virtual machine A disk 3 126. The first computer 102 also includes a virtual machine B 128, to which are attached a virtual machine B disk 1 130 and a virtual machine B disk 2 132. The second computer 104 includes a virtual machine C 134, to which are attached a virtual machine C disk 1 136, a virtual machine C disk 2 138, and a virtual machine C disk 3 140. Although FIG. 1 depicts two computers 102-104 which host three virtual machines 120, 128, and 134, to which are attached eight virtual machine disks 122-126, 130, 132, and 136-140, the system 100 may include any number of computers 102-104 which host any number of virtual machines 120, 128, and 134, to which are attached any number of virtual machine disks 122-126, 130, 132, and 136-140.

The third computer 106 includes virtual machine storage application program interfaces for data protection 142, a virtual machine center application 144, a first image proxy appliance 146, and a second image proxy appliance 148. The first image proxy appliance 146 includes a first configuration generator 150 and a first consolidator 152, while the second image proxy appliance 148 includes a second configuration generator 154 and a second consolidator 156.

The backup application 118 can create images of virtual machines and copy those to backup storage through the virtual machine storage application program interfaces for data protection 142, which provides a set of drivers and scripts that enable the backup application 118 to perform file- or virtual machine-level backup of running virtual machines. The virtual machine storage application program interfaces for data protection 142 enables the backup application 118 to embed the intelligence needed to protect virtual machines without the need to install a backup agent within the guest operating system. By not requiring backup processing to be done inside each virtual machine on a host computer, the virtual machine storage application program interfaces for data protection 142 offloads backup processing from hosts and allows each host to run more virtual machines.

The virtual machine center application 144 can provide a centralized and extensible platform for managing virtual infrastructure, which includes the computers 102-104. This managing of virtual machine environments may enable information technology administrators to have simple and automated control over a virtual environment to deliver infrastructure. The virtual machine center application 144 can provide centralized management of virtualized hosts and virtual machines from a single console, and give administrators visibility into the configuration of all the critical components of a virtual infrastructure, all from one place. The virtual machine center application 144 can enable easier management, as a single administrator can manage hundreds of workloads, more than doubling typical productivity in managing physical infrastructure.

The image proxy appliances 146-148 may be deployed as downloadable open virtualization appliance files, each of which is a single compressed file that contains an operating system image, packages, boot scripts, etc. Any number of the image proxy appliances 146-148 may be deployed as a module that may plug into the virtual machine center application 144, which may enable any number of the image proxy appliances 146-148 to access each of the virtual machines 120, 128, and 134 monitored and controlled by the virtual machine center application 144. Any number of the image proxy appliances 146-148 may be deployed as a module that may plug into the backup application 118, which a data protection administrator may access to monitor and control any number of image proxy appliances 146-148. The capability of monitoring and controlling any number of image proxy appliances 146-148 may provide the backup application 118 with the capacity to offer full enterprise level protection of data for all of an enterprise's virtual machines 120, 128, and 134.

Disaster recovery for a failed virtual machine may be required due to file system corruption, a host failure, a network outage, a storage disk failure, an array failure, an application failure, or any other reason or combinations of reasons. During disaster recovery, an image proxy appliance identifies restoration parameters for restoring a failed virtual machine as a new virtual machine and restoring the failed virtual machine's multiple virtual machine disks as new multiple virtual machine disks. For example, the backup application 118 identifies restoration parameters stored in the storage array 110 for the failed virtual machine A 120 and its three virtual machine disks 122-126, such as a virtual machine name, virtual machine disk sizes, a virtual machine disk type, and data store information. Continuing the example, the backup application 118 identifies that the first image proxy appliance 146 is available, and sends the restoration parameters to the first image proxy appliance 146. The virtual machine name may match the original name of the failed virtual machine, with a number appended to it to indicate the virtual disk number in sequence. The virtual disk sizes may match the original sizes of the failed virtual machine's virtual machine disks that were recorded during the time of backup. The virtual disk types may match the original failed virtual machine's virtual machine disk types that were recorded during the time of backup.

The data store information may include user input received during the disaster recovery process, which identifies which data store is used to create a virtual machine disk. If a user does not specifically select a data store for restoration, the backup and restore application 118 may use the data store which originally stored the virtual machine disks as a default data store for restoring the virtual machine disks. If a user specifies to restore virtual machine disks to a data store that is not the data store which originally stored the virtual machine disks, the backup and restore application 118 may determine whether the new data store has sufficient capacity for storing the virtual machine disks to be restored. If not, the backup and restore application 118 may notify the user about the lack of storage capacity, and may present various alternatives for restoring the virtual machine disks to data stores which individually or collectively have the required capacity. A single data store may store all of the restored virtual machine disks or different data stores may store each of the different restored virtual machine disks. Using a different data store for each different virtual machine disk being restored may provide better input/output performance during disaster recovery due to writes being directed to multiple different data stores rather than being directed to a single data store. For example, during the disaster recovery process, a user specifies to restore virtual machine A disk 1 122 of 10 GB to data store 1, to restore virtual machine A disk 2 124 of 20 GB to data store 2, and to restore virtual machine A disk 3 126 of 30 GB to data store 3.

After receiving restoration parameters, an image proxy appliance optionally restores a failed virtual machine as a new virtual machine. For example, the first image proxy appliance 146 restores the failed virtual machine A 120 as the new virtual machine C 134. After receiving restoration parameters, an image proxy appliance identifies multiple available threads that are sufficient for parallel restoration of each of the failed virtual machine's multiple virtual machine disks. For example, the first image proxy appliance 146 identifies two of its available threads that are sufficient for parallel restoration of the second and the third failed virtual machine disks 124-126 while the first virtual machine disk 122 is being restored. If an image proxy appliance does not currently have the sufficient number of available threads for parallel restoration of each of the failed virtual machine's multiple virtual machine disks, which may be due to some of the image proxy appliance's threads being busy executing other tasks, then the image proxy appliance iterates through a list of the failed virtual machine's virtual machine disks to sequentially restore only one virtual machine disk for the failed virtual machine at a time.

After an image proxy appliance identifies a sufficient number of available threads for parallel restoration of each of a failed virtual machine's multiple virtual machine disks, each of the multiple available threads restores a corresponding virtual machine disk as a corresponding dummy virtual machine, based on restoration parameters. For example, the configuration generator 150 modifies the restoration parameters to generate configuration data for the creating of three total dummy virtual machines, one dummy virtual machine for the virtual machine disk that would have already been the first of the dummy virtual machines to be sequentially created, and two additional dummy virtual machines to be created in parallel with the first dummy virtual machine. The configuration data for the virtual machine disk that would have already been the first of the dummy virtual machines to be sequentially created may specify a virtual machine name set to VM-A, a data store set to DS1, a virtual disk size set to 10 GB, and a virtual disk type set to thin. The configuration data for the first additional dummy virtual machine may specify a virtual machine name set to VM-A_1, a data store set to DS2, a virtual disk size set to 20 GB, and a virtual disk type set to thin. The configuration data for the second additional dummy virtual machine may specify a virtual machine name set to VM-A_2, a data store set to DS3, a virtual disk size set to 30 GB, and a virtual disk type set to thin. In addition to this configuration data, the configuration generator 150 generates one restore-as-new virtual machine request derived from the original failed virtual machine A 120. In the derived request, the configuration generator 150 requests a single restore of the virtual machine A disk 1 122 as a new virtual machine, as opposed to sequentially restoring the virtual machine A disk 1 122, the virtual machine A disk 2 124, and the virtual machine A disk 3 126. The configuration generator 150 splits the derived request into 3 different restore streams: restore-as-new operation for a virtual machine disk of VM-A, restore-as-new operation for VM-A_1, and restore-as-new operation for VM-A_2. Continuing the example, the two available threads read an existing backup copy of the two failed virtual machine disks 124-126 from the storage array 110, and restores the two failed virtual machine disks 124-126 as a dummy virtual machine 1 and a dummy virtual machine 2, respectively, based on the configuration data, while the first virtual machine disk 122 is being restored.

After creating multiple dummy virtual machines, an image proxy appliance attaches each of the multiple dummy virtual machines to the new virtual machine as the new virtual machine's multiple new virtual machine disks. For example, the consolidator 152 removes the dummy virtual machine 1 and the dummy virtual machine 2 from a virtual machine inventory. Then the consolidator 152 attaches the dummy virtual machine 1 and the dummy virtual machine 2 with the restored first virtual machine disk 122 to the new virtual machine C 134 as the three new virtual machine disks 136-140, in the same order that the three virtual machine disks 122-126 were attached to the failed virtual machine A 120.

Figure 2:
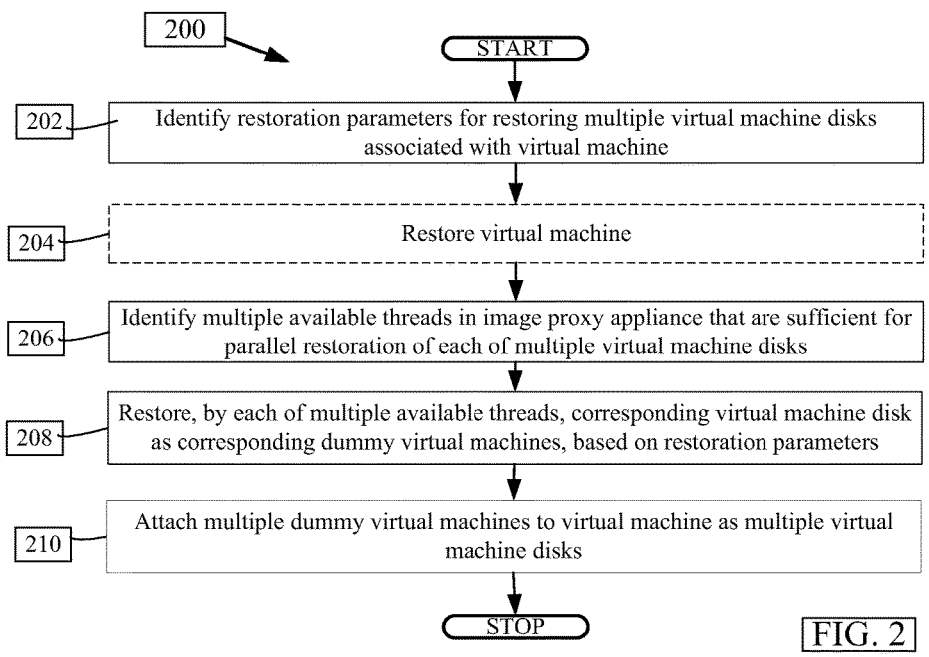
FIG. 2 is a flowchart that illustrates a method of parallel restoration of a virtual machine's virtual machine disks, under an embodiment.

FIG. 2 is a flowchart that illustrates a method for parallel restoration of a virtual machine's virtual machine disks, under an embodiment. Flowchart 200 illustrates method acts illustrated as flowchart blocks for certain steps involved in and/or between the computers 102-106 and/or the server 108 of FIG. 1.

An image proxy appliance identifies restoration parameters for restoring multiple virtual machine disks associated with a virtual machine, block 202. For example, the backup application 118 identifies restoration parameters stored in the storage array 110 for the failed virtual machine A 120 and its three virtual machine disks 122-126, and sends the restoration parameters to the first image proxy appliance 146.

After identifying restoration parameters, an image proxy appliance optionally restores a virtual machine, block 204. For example, the first image proxy appliance 146 restores the failed virtual machine A 120 as the new virtual machine C 134.

After identifying restoration parameters, an image proxy appliance identifies multiple available threads that are sufficient for parallel restoration of each of a virtual machine's multiple virtual machine disks, block 206. For example, the first image proxy appliance 146 identifies two of its available threads that are sufficient for parallel restoration of the second and the third virtual machine disks 124-126 while the first virtual machine disk 122 is being restored.

Each of multiple available threads in an image proxy appliance restores a corresponding virtual machine disk as a corresponding dummy virtual machine, based on restoration parameters, block 208. For example, each of the two available threads restores a corresponding virtual machine disk as a corresponding dummy virtual machine, based on the restoration parameters, while the first virtual machine disk 122 is being restored.

An image proxy appliance attaches multiple dummy virtual machines to a virtual machine as multiple virtual machine disks, block 210. For example, the image proxy appliance 146 attaches the two dummy virtual machines with the restored first virtual machine disk 122 to the new virtual machine C 134 as the three virtual machine disks 136-140.

Although FIG. 2 depicts the blocks 202-210 occurring in a specific order, the blocks 202-210 may occur in another order. In other implementations, each of the blocks 202-210 may also be executed in combination with other blocks and/or some blocks may be divided into a different set of blocks.

Figure 3:
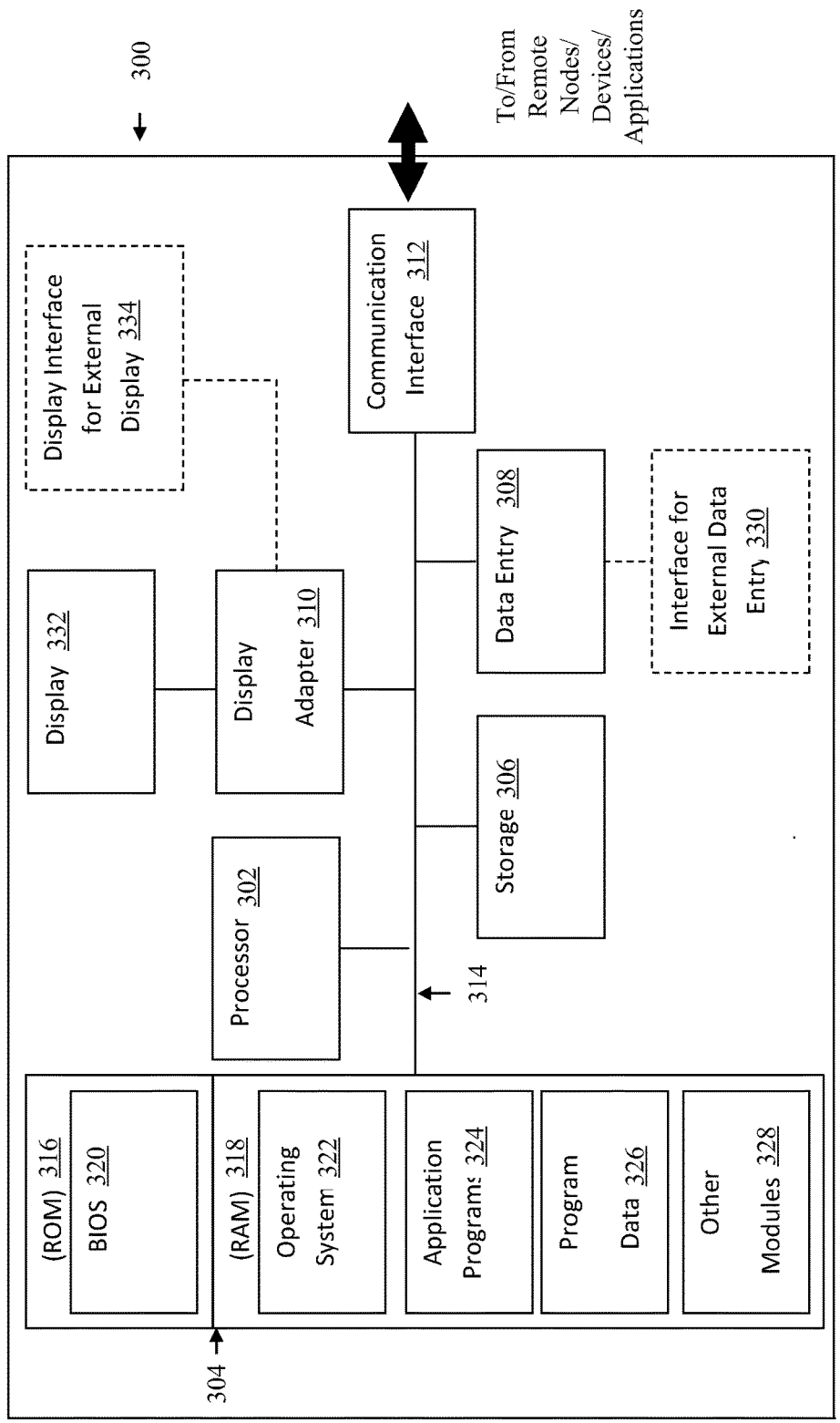
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for parallel restoration of a virtual machine's virtual machine disks, the system comprising:
   a computer comprising a processor;
   a processor-based application, which when executed on the computer, will cause the processor to:
   identify restoration parameters associated with for a plurality of virtual machine disks and a virtual machine, each of the plurality of virtual machine disks being associated with the virtual machine;
   identify a plurality of available threads in an image proxy appliance that is sufficient for parallel restoration of each of the plurality of virtual machine disks;
   restore, by one of the plurality of available threads, one of the plurality of virtual machine disks, the restoration being based on the restoration parameters;
   restore, by the remaining plurality of available threads, in response to identifying the restoration parameters and in response to the identifying the plurality of available threads, the remaining plurality of virtual machine disks as corresponding dummy virtual machines, the restoration of the remaining virtual machine disks being based on the restoration parameters and being performed in parallel with the restoration of the one available thread; and
   attach the restored virtual machine disk and the dummy virtual machines to the virtual machine as restored virtual machine disks.

2. The system of claim 1, wherein identifying the restoration parameters comprises a backup application identifying the restoration parameters stored in backup storage and sending the restoration parameters to the image proxy appliance.

3. The system of claim 1, wherein the restoration parameters comprise a virtual machine name, a virtual machine disk size, a virtual machine disk type, and data store information.

4. The system of claim 1, wherein restoring the remaining plurality of virtual machine disks comprises generating configuration data for creating the corresponding dummy virtual machines based on a modification to the restoration parameters.

5. The system of claim 1, wherein restoring the one of the plurality of virtual machine disks and the remaining plurality of virtual machine disks comprises reading an existing backup copy of the corresponding one of the plurality of virtual machine disks from backup storage.

6. The system of claim 1, wherein attaching the dummy virtual machines to the virtual machine as the plurality of virtual machine disks comprises removing the dummy virtual machines from a virtual machine inventory.

7. The system of claim 1, wherein the processor-based application further causes the processor to restore the virtual machine.

8. A computer-implemented method for parallel restoration of a virtual machine's virtual machine disks, the method comprising:
   identifying restoration parameters associated with for a plurality of virtual machine disks and a virtual machine, each of the plurality of virtual machine disks being associated with the virtual machine;
   identifying a plurality of available threads in an image proxy appliance that is sufficient for parallel restoration of each of the plurality of virtual machine disks;
   restoring, by one of the plurality of available threads, one of the plurality of virtual machine disks, the restoration being based on the restoration parameters;
   restore, by the remaining plurality of available threads, in response to identifying the restoration parameters and in response to the identifying the plurality of available threads, the remaining plurality of virtual machine disks as corresponding dummy virtual machines, the restoration of the remaining virtual machine disks being performed in parallel with the restoration of the one available; and
   attaching the restored virtual machine disk and the dummy virtual machines to the virtual machine as restored virtual machine disks.

9. The method of claim 8, wherein identifying the restoration parameters comprises a backup application identifying the restoration parameters stored in backup storage and sending the restoration parameters to the image proxy appliance.

10. The method of claim 8, wherein the restoration parameters comprise a virtual machine name, a virtual machine disk size, a virtual machine disk type, and data store information.

11. The method of claim 8, wherein restoring the remaining plurality of virtual machine disks comprises generating configuration data for creating the corresponding dummy virtual machines based on a modification to the restoration parameters.

12. The method of claim 8, wherein restoring the one of the plurality of virtual machine disks and the remaining plurality of virtual machine disks comprises reading an existing backup copy of the corresponding one of the plurality of virtual machine disks from backup storage.

13. The method of claim 8, wherein attaching the dummy virtual machines to the virtual machine as the plurality of virtual machine disks comprises removing the dummy virtual machines from a virtual machine inventory.

14. The method of claim 8, wherein the method further comprises restoring the virtual machine.

15. A computer program product, comprising a non-transitory computer-readable medium having a computer-readable program code embodied therein to be executed by one or more processors, the program code including instructions to:

identify restoration parameters associated with for a plurality of virtual machine disks and a virtual machine, each of the plurality of virtual machine disks being associated with the virtual machine;

identify a plurality of available threads in an image proxy appliance that is sufficient for parallel restoration of each of the plurality of virtual machine disks;

restore, by one of the plurality of available threads, one of the plurality of virtual machine disks, the restoration being based on the restoration parameters;

restore, by the remaining plurality of available threads, in response to identifying the restoration parameters and in response to the identifying the plurality of available threads, the remaining plurality of virtual machine disks as corresponding dummy virtual machines, the restoration of the remaining virtual machine disks being performed in parallel with the restoration of the one available thread; and attach the restored virtual machine disk and the dummy virtual machines to the virtual machine as restored virtual machine disks.

16. The computer program product of claim 15, wherein identifying the restoration parameters comprises a backup application identifying the restoration parameters stored in backup storage and sending the restoration parameters to the image proxy appliance, and wherein the restoration parameters comprise a virtual machine name, a virtual machine disk size, a virtual machine disk type, and data store information.

17. The computer program product of claim 15, wherein restoring the remaining plurality of virtual machine disks comprises generating configuration data for creating the corresponding dummy virtual machines based on a modification to the restoration parameters.

18. The computer program product of claim 15, wherein restoring the one of the plurality of virtual machine disks and the remaining plurality of virtual machine disks comprises reading an existing backup copy of the corresponding one of the plurality of virtual machine disks from backup storage.

19. The computer program product of claim 15, wherein attaching the dummy virtual machines to the virtual machine as the plurality of virtual machine disks comprises removing the dummy virtual machines from a virtual machine inventory.

20. The computer program product of claim 15, wherein the program code includes further instructions to restore the virtual machine.

* * * * *